United States Patent
Ollila

(10) Patent No.: US 10,798,332 B1
(45) Date of Patent: Oct. 6, 2020

(54) DUAL PASS-THROUGH IMAGING SYSTEM AND METHOD

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/796,236

(22) Filed: Feb. 20, 2020

(51) Int. Cl.
  *G02B 27/01* (2006.01)
  *G09G 5/00* (2006.01)
  *H04N 5/74* (2006.01)
  *H04N 5/33* (2006.01)
  *H04N 5/225* (2006.01)

(52) U.S. Cl.
  CPC ............. *H04N 5/7408* (2013.01); *G09G 5/00* (2013.01); *H04N 5/33* (2013.01); *H04N 5/2253* (2013.01)

(58) Field of Classification Search
  CPC .......... H04N 5/33; H04N 5/2253; H04N 5/64; H04N 9/31; H04N 5/7408; H04N 7/18; G02B 17/01; G02B 17/0101; G09G 5/00
  USPC ................................. 345/156; 348/139, 744
  See application file for complete search history.

(56) References Cited

U.S. PATENT DOCUMENTS

| | | | |
|---|---|---|---|
| 9,606,354 B2 * | 3/2017 | Spitzer | G02B 27/0103 |
| 9,924,866 B2 * | 3/2018 | Tian | A61B 3/113 |
| 10,547,830 B2 * | 1/2020 | Ovsiannikov | H04N 13/257 |
| 10,609,361 B2 * | 3/2020 | Mlinar | H04N 13/271 |
| 2016/0309135 A1 * | 10/2016 | Ovsiannikov | H04N 5/23245 |
| 2017/0230638 A1 * | 8/2017 | Wajs | H04N 13/214 |
| 2020/0178543 A1 * | 6/2020 | Stork gennant Wersborg | G01N 33/02 |

* cited by examiner

*Primary Examiner* — Trang U Tran
(74) *Attorney, Agent, or Firm* — Ziegler IP Law Group, LLC

(57) ABSTRACT

An imaging system including infrared light source, imaging unit and processor. Imaging unit includes first and second image-sensor chips, semi-transparent reflective element, infrared filter arranged to block transmission of infrared light towards first image-sensor chip, and means for transmitting infrared light received from overlapping field of view towards second image-sensor chip, whilst blocking transmission of infrared light received from non-overlapping field of view towards second image-sensor chip. First and second image-sensor chips are controlled to capture first and second images of real-world environment, wherein portion of second image-sensor chip that receives infrared light from overlapping field of view captures depth information pertaining to overlapping field of view. Extended-reality image is generated from first and second images, based on depth information.

20 Claims, 7 Drawing Sheets

DUAL PASS-THROUGH IMAGING SYSTEM AND METHOD

TECHNICAL FIELD

The present disclosure relates to imaging systems for producing images for display apparatuses. The present disclosure also relates to display apparatuses incorporating such imaging systems. Moreover, the present disclosure relates to methods for producing images for display apparatuses.

BACKGROUND

In a typical video see-through display apparatus (for example, a video see-through head-mounted device), visible-light cameras are employed to capture images of a real-world environment. As visible-light cameras are sensitive to infrared light, infrared filters are used to block transmission of the infrared light towards the cameras' sensor chips. Specifically, an exposure to infrared light affects the sensor chips' ability to measure an intensity of visible light, thereby resulting in poor image quality (which is apparent as, for example, inaccurate colour representation and reduced image contrast).

In order to generate an extended-reality environment from the captured images of the real-world environment, depth information about the real-world environment is required. Accurate depth information can be captured using infrared light. Moreover, infrared light is also required for gesture recognition. Thus, additional depth cameras are employed in a typical video see-through display apparatus to capture depth information about a real-world environment. The additional depth cameras make the display apparatus bulky, whilst increasing a complexity and an overall cost of the display apparatus.

SUMMARY

The present disclosure seeks to provide an imaging system for producing images for a display apparatus. The present disclosure also seeks to provide a display apparatus incorporating such an imaging system. Moreover, the present disclosure seeks to provide a method for producing images for a display apparatus. Furthermore, the present disclosure also seeks to provide a solution to the existing problems of display apparatuses.

In a first aspect, an embodiment of the present disclosure provides an imaging system for producing images for a display apparatus, the imaging system comprising:
an infrared light source that, in operation, emits infrared light;
at least one imaging unit comprising:
  a first image-sensor chip having a first field of view;
  a second image-sensor chip having a second field of view, the second field of view being wider than the first field of view, wherein the second field of view comprises an overlapping field of view that overlaps with the first field of view and a remaining non-overlapping field of view;
  a semi-transparent reflective element arranged to reflect a portion of light received from a real-world environment towards the first image-sensor chip, whilst transmitting another portion of the light towards the second image-sensor chip;
  a first infrared filter arranged, on an optical path between the semi-transparent reflective element and the first image-sensor chip, to block transmission of infrared light towards the first image-sensor chip; and
  means for transmitting infrared light received from the overlapping field of view towards the second image-sensor chip, whilst blocking transmission of infrared light received from the non-overlapping field of view towards the second image-sensor chip, said means being arranged on an optical path between the semi-transparent reflective element and the second image-sensor chip; and at least one processor, communicably coupled to the infrared light source and the at least one imaging unit, configured to:
  control the first image-sensor chip and the second image-sensor chip to capture a first image and a second image of the real-world environment, respectively, wherein a portion of the second image-sensor chip that receives the infrared light from the overlapping field of view, in operation, captures depth information pertaining to the overlapping field of view, and wherein a resolution of the first image is higher than a resolution of the second image; and
  generate from the first image and the second image at least one extended-reality image to be presented via the display apparatus, based on said depth information.

In a second aspect, an embodiment of the present disclosure provides a display apparatus comprising:
at least one image renderer;
an infrared light source that, in operation, emits infrared light;
at least one imaging unit comprising:
  a first image-sensor chip having a first field of view;
  a second image-sensor chip having a second field of view, the second field of view being wider than the first field of view, wherein the second field of view comprises an overlapping field of view that overlaps with the first field of view and a remaining non-overlapping field of view;
  a semi-transparent reflective element arranged to reflect a portion of light received from a real-world environment towards the first image-sensor chip, whilst transmitting another portion of the light towards the second image-sensor chip;
  a first infrared filter arranged, on an optical path between the semi-transparent reflective element and the first image-sensor chip, to block transmission of infrared light towards the first image-sensor chip; and
  means for transmitting infrared light received from the overlapping field of view towards the second image-sensor chip, whilst blocking transmission of infrared light received from the non-overlapping field of view towards the second image-sensor chip, said means being arranged on an optical path between the semi-transparent reflective element and the second image-sensor chip; and at least one processor configured to:
  control the first image-sensor chip and the second image-sensor chip to capture a first image and a second image of the real-world environment, respectively, wherein a portion of the second image-sensor chip that receives the infrared light from the overlapping field of view, in operation, captures depth information pertaining to the overlapping field of view, and wherein a resolution of the first image is higher than a resolution of the second image;
  generate from the first image and the second image at least one extended-reality image, based on said depth information; and
  render the at least one extended-reality image via the at least one image renderer.

In a third aspect, an embodiment of the present disclosure provides a method for producing images for a display apparatus, the method being implemented via an imaging system comprising an infrared light source and at least one imaging unit comprising:

a first image-sensor chip having a first field of view;

a second image-sensor chip having a second field of view, the second field of view being wider than the first field of view, wherein the second field of view comprises an overlapping field of view that overlaps with the first field of view and a remaining non-overlapping field of view;

a semi-transparent reflective element arranged to reflect a portion of light received from a real-world environment towards the first image-sensor chip, whilst transmitting another portion of the light towards the second image-sensor chip;

a first infrared filter arranged, on an optical path between the semi-transparent reflective element and the first image-sensor chip, to block transmission of infrared light towards the first image-sensor chip; and means for transmitting infrared light received from the overlapping field of view towards the second image-sensor chip, whilst blocking transmission of infrared light received from the non-overlapping field of view towards the second image-sensor chip, said means being arranged on an optical path between the semi-transparent reflective element and the second image-sensor chip, the method comprising:

emitting infrared light via the infrared light source;

capturing, via the first image-sensor chip and the second image-sensor chip, a first image and a second image of the real-world environment, respectively, wherein the step of capturing comprises capturing depth information pertaining to the overlapping field of view via a portion of the second image-sensor chip that receives the infrared light from the overlapping field of view, and wherein a resolution of the first image is higher than a resolution of the second image; and generating from the first image and the second image at least one extended-reality image to be presented via the display apparatus, based on said depth information.

Embodiments of the present disclosure substantially eliminate or at least partially address the aforementioned problems in the prior art, by employing a wide-angle image-sensor chip and a narrow-angle image-sensor chip to capture a low-resolution image of a real-world environment and a high-resolution image of an overlapping field of view, respectively, wherein the same wide-angle image-sensor chip is also employed to capture depth information pertaining to the overlapping field of view.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
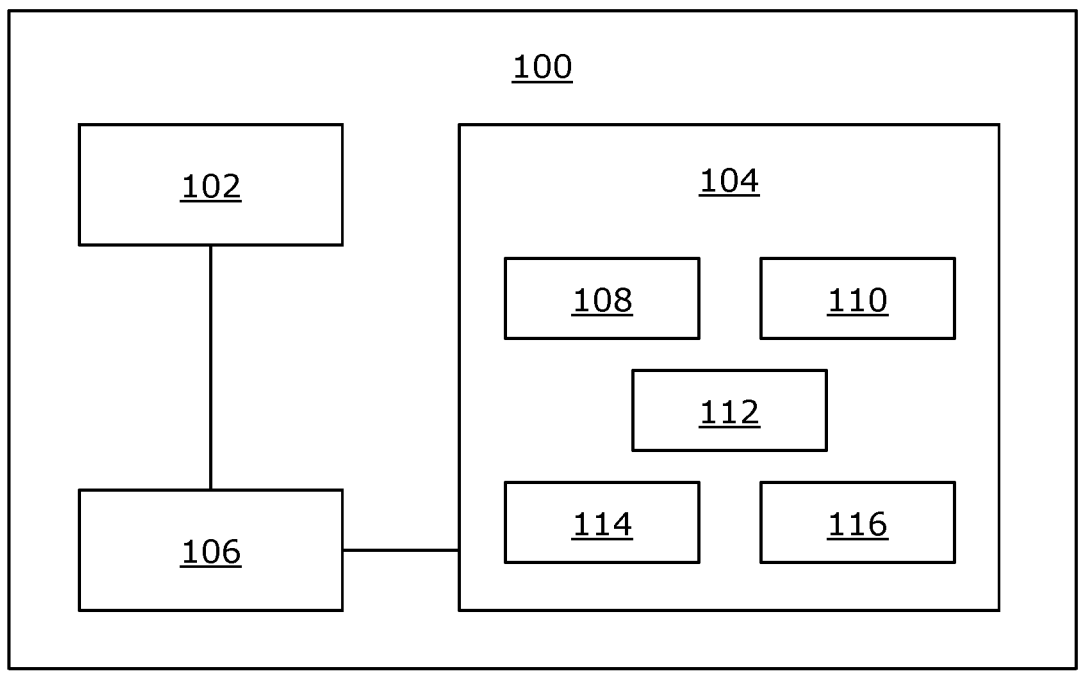
FIG. 1 is a block diagram of architecture of an imaging system, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides an imaging system for producing images for a display apparatus, the imaging system comprising:

an infrared light source that, in operation, emits infrared light;

at least one imaging unit comprising:

a first image-sensor chip having a first field of view;

a second image-sensor chip having a second field of view, the second field of view being wider than the first field of view, wherein the second field of view comprises an overlapping field of view that overlaps with the first field of view and a remaining non-overlapping field of view;

a semi-transparent reflective element arranged to reflect a portion of light received from a real-world environment towards the first image-sensor chip, whilst transmitting another portion of the light towards the second image-sensor chip;

a first infrared filter arranged, on an optical path between the semi-transparent reflective element and the first image-sensor chip, to block transmission of infrared light towards the first image-sensor chip; and means for transmitting infrared light received from the overlapping field of view towards the second image-sensor chip, whilst blocking transmission of infrared light received from the non-overlapping field of view towards the second image-sensor chip, said means being arranged on an optical path between the semi-transparent reflective element and the second image-sensor chip; and at least one processor, communicably coupled to the infrared light source and the at least one imaging unit, configured to:

control the first image-sensor chip and the second image-sensor chip to capture a first image and a second image of the real-world environment, respectively, wherein a portion of the second image-sensor chip that receives the infrared light from the overlapping field of view, in operation, captures depth information pertaining to the overlapping field of view, and wherein a resolution of the first image is higher than a resolution of the second image; and generate from the first image and the second image at least one extended-reality image to be presented via the display apparatus, based on said depth information.

In a second aspect, an embodiment of the present disclosure provides a display apparatus comprising:

at least one image renderer;

an infrared light source that, in operation, emits infrared light;

at least one imaging unit comprising:

a first image-sensor chip having a first field of view;

a second image-sensor chip having a second field of view, the second field of view being wider than the first field of view, wherein the second field of view comprises an overlapping field of view that overlaps with the first field of view and a remaining non-overlapping field of view;

a semi-transparent reflective element arranged to reflect a portion of light received from a real-world environment towards the first image-sensor chip, whilst transmitting another portion of the light towards the second image-sensor chip;

a first infrared filter arranged, on an optical path between the semi-transparent reflective element and the first image-sensor chip, to block transmission of infrared light towards the first image-sensor chip; and means for transmitting infrared light received from the overlapping field of view towards the second image-sensor chip, whilst blocking transmission of infrared light received from the non-overlapping field of view towards the second image-sensor chip, said means being arranged on an optical path between the semi-transparent reflective element and the second image-sensor chip; and at least one processor configured to:

control the first image-sensor chip and the second image-sensor chip to capture a first image and a second image of the real-world environment, respectively, wherein a portion of the second image-sensor chip that receives the infrared light from the overlapping field of view, in operation, captures depth information pertaining to the overlapping field of view, and wherein a resolution of the first image is higher than a resolution of the second image;

generate from the first image and the second image at least one extended-reality image, based on said depth information; and render the at least one extended-reality image via the at least one image renderer.

In a third aspect, an embodiment of the present disclosure provides a method for producing images for a display apparatus, the method being implemented via an imaging system comprising an infrared light source and at least one imaging unit comprising:

a first image-sensor chip having a first field of view;

a second image-sensor chip having a second field of view, the second field of view being wider than the first field of view, wherein the second field of view comprises an overlapping field of view that overlaps with the first field of view and a remaining non-overlapping field of view;

a semi-transparent reflective element arranged to reflect a portion of light received from a real-world environment towards the first image-sensor chip, whilst transmitting another portion of the light towards the second image-sensor chip;

a first infrared filter arranged, on an optical path between the semi-transparent reflective element and the first image-sensor chip, to block transmission of infrared light towards the first image-sensor chip; and means for transmitting infrared light received from the overlapping field of view towards the second image-sensor chip, whilst blocking transmission of infrared light received from the non-overlapping field of view towards the second image-sensor chip, said means being arranged on an optical path between the semi-transparent reflective element and the second image-sensor chip, the method comprising:

emitting infrared light via the infrared light source;

capturing, via the first image-sensor chip and the second image-sensor chip, a first image and a second image of the real-world environment, respectively, wherein the step of capturing comprises capturing depth information pertaining to the overlapping field of view via a portion of the second image-sensor chip that receives the infrared light from the overlapping field of view, and wherein a resolution of the first image is higher than a resolution of the second image; and generating from the first image and the second image at least one extended-reality image to be presented via the display apparatus, based on said depth information.

Embodiments of the present disclosure provide the aforementioned imaging system, display apparatus and method. The imaging system employs a wide-angle image-sensor chip (namely, the second image-sensor chip) and a narrow-angle image-sensor chip (namely, the first image-sensor chip) to capture a low-resolution image of a real-world environment and a high-resolution image of an overlapping field of view, respectively, wherein the same wide-angle image-sensor chip is also employed to capture depth information pertaining to the overlapping field of view. Thus, the imaging system disclosed herein eliminates a requirement of an additional depth camera for depth measurement.

Moreover, as the resolution of the first image is higher than the resolution of the second image, the at least one extended-reality image (generated from the first image and the second image) presents a user with a visual scene having a spatially variable angular resolution.

The infrared light source emits infrared light towards objects present in the real-world environment. The infrared light source could emit pulses of infrared light. Alternatively, the infrared light source could emit a patterned infrared light (for example, a pattern of light spots, lines or a combination thereof).

There could be one common infrared light source between two imaging units (namely, one for a left eye and another for a right eye of the user). Alternatively, there could be a dedicated IR light source for each of the two imaging units.

In the at least one imaging unit, the first image-sensor chip and the first infrared filter are implemented as a part of a first camera. Likewise, the second image-sensor chip and, optionally, said means are implemented as a part of a second camera. Such cameras could be implemented as at least one of: a Red-Green-Blue (RGB) camera, an RGB-Depth (RGB-D) camera, a plenoptic camera.

It will be appreciated that the first image-sensor chip and the second image-sensor chip are arranged to capture the first image and the second image from a perspective of a first eye and a second eye of the user, respectively. The first image and the second image are utilized to provide a Video See-Through (VST) experience to the user.

Moreover, optionally, the semi-transparent reflective element is implemented as at least one of: a semi-transparent mirror, a semi-transparent film, a prism.

The semi-transparent reflective element may be fixed or movable. Optionally, the first image-sensor chip and the second image-sensor chip are arranged at fixed positions. Alternatively, optionally, the first image-sensor chip and/or the second image-sensor chip are implemented as movable components.

In some implementations, the first image-sensor chip and the second image-sensor chip are arranged perpendicular to each other. In such implementations, the semi-transparent reflective element could be arranged approximately at an angle of 45 degrees with respect to a plane of the second image-sensor chip. It will be appreciated that the first image-sensor chip and the second image-sensor chip could be arranged at any other suitable angle with respect to each other; in such a case, the semi-transparent reflective element could be arranged accordingly.

The second field of view (FOV) substantially surrounds and includes the first FOV. In a fixed foveation case, the overlapping FOV is a central portion of the second FOV, whereas the non-overlapping FOV is a peripheral portion of the second FOV. In such a case, the first image-sensor chip, the second image-sensor chip and the semi-transparent reflective element could beneficially be arranged at fixed positions.

In an active foveation case, the overlapping FOV can be at any portion of the second FOV depending on the user's gaze. Optionally, in this regard, the semi-transparent reflective element is implemented as a movable component, whereas the first image-sensor chip and the second image-sensor chip are arranged at fixed positions. Alternatively, optionally, the first image-sensor chip is implemented as a moveable component, whereas the semi-transparent reflective element and the second image-sensor chip are arranged at fixed positions. Yet alternatively, optionally, the first image-sensor chip and the semi-transparent reflective element are implemented as moveable components, whereas the second image-sensor chip is arranged at a fixed position.

Furthermore, it will be appreciated that the first infrared filter blocks the transmission of infrared light, whilst transmitting visible light towards the first image-sensor chip. Thus, the first image captured by the first image-sensor chip is beneficially of an enhanced image quality as problems arising due to infrared light are eliminated.

Moreover, said means transmits the infrared light received from the overlapping FOV and blocks the transmission of the infrared light received from the non-overlapping FOV towards the second image-sensor chip, whilst transmitting visible light towards the second image-sensor chip. Thus, an overlapping portion of the second image (that is captured by the portion of the second image-sensor chip receiving the infrared light from the overlapping FOV) is representative of the depth information pertaining to the overlapping FOV, whereas a non-overlapping portion (namely, a remaining portion) of the second image (that is captured by a remaining portion of the second image-sensor chip receiving only the visible light from the non-overlapping FOV) is beneficially of an enhanced image quality as problems arising due to infrared light are eliminated.

Optionally, the at least one extended-reality image is generated by superimposing the first image with the overlapping portion of the second image. In other words, the overlapping portion of the second image is beneficially not presented to the user. Thus, there is no loss of image quality due to infrared light in the at least one extended-reality image generated from the first image and the second image.

It will be appreciated that the infrared light source and the second image-sensor chip are to be controlled in sync. Optionally, the depth information is captured using time-of-flight measurements. The time-of-flight measurements are obtained by measuring a distance between the second image-sensor chip and a given object (present in the real-world environment), based on a time difference between an emission of a light pulse from the infrared light source and its return to the second image-sensor chip after being reflected from a surface of the given object. Infrared light is beneficially employed in time-of-flight measurements to reduce signal disturbance, as the infrared light is easily distinguished from natural ambient light. Alternatively, optionally, the depth information is captured by comparing reflections of patterned infrared light (from surfaces of the object present in the real-world environment) with a reference image of the patterned infrared light. Yet alternatively, optionally, the depth information is captured by using triangulation with a pair of second images captured by second image-sensor chips of two imaging units (namely, one for the left eye and another for the right eye of the user).

It will be appreciated that the depth information comprises information about an optical depth of a given object or a part thereof with respect to the second image-sensor chip. Therefore, the depth information of the captured environment provides critical information that enables the at least one processor to determine shapes of the surfaces of the objects and relative positions of the objects in the captured environment.

The depth information can be utilized in various applications, for example, such as three-dimensional reconstruction of objects in an extended-reality environment. As an example, in augmented-reality applications, the depth information can be employed to determine relative positions of real objects in the real-world environment accurately and to place virtual objects at desired positions.

Moreover, the depth information could also be employed to facilitate efficient human-machine interaction. As an example, the depth information can be employed in computer games and multimedia applications to detect and process human gestures (using well-known gesture recognition techniques) to control various functionalities provided by these computer games and multimedia applications.

Furthermore, according to an embodiment, said means comprises a second infrared filter having a hole at a central portion thereof, wherein the hole in the second infrared filter allows transmission of the infrared light towards the second image-sensor chip. It will be appreciated that the hole in the second infrared filter could have any shape, for example, such as a polygonal shape, an elliptical shape and a circular shape.

A given infrared filter (namely, the first infrared filter or the second infrared filter) could be implemented as an infrared absorber or an infrared reflector. The given infrared filter could be produced by forming a layer or coating of an infrared-absorbing material or an infrared-reflecting material on a substrate.

According to another embodiment, said means comprises a first dual-bandpass filter and a second dual-bandpass filter, wherein the first dual-bandpass filter is angle dependent. In other words, the first dual-bandpass filter is implemented as an angle-dependent filter. Throughout the present disclosure, the term "dual-bandpass filter" refers to a filter that has two passbands, while the term "angle-dependent filter" refers to a filter whose passband(s) shift depending on an incident angle at which light is incident thereon. It will be appreciated that angle-dependent filters can be produced in bulk as a single large frame comprising hundreds of uniformly-coated portions that are diced (namely, singulated) from the single large frame to produce individual filters. It will also be appreciated that the first dual-bandpass filter and the second dual-bandpass filter could be arranged in any order, as separate components or separate layers of a same component.

Moreover, optionally, the first dual-bandpass filter is a dichroic filter. Optionally, the first dual-bandpass filter and the second dual-bandpass filter allow transmission of infrared light that is incident on the first dual-bandpass filter at an incident angle lying within a range that is selected from within a range of −30 degrees to +30 degrees. Alternatively, optionally, the first dual-bandpass filter and the second dual-bandpass filter allow transmission of infrared light that is incident on the first dual-bandpass filter at an incident angle lying within a range that is selected from within a range of +15 degrees to +75 degrees.

For illustration purposes only, there will now be considered an example implementation, wherein the first dual-bandpass filter and the second dual-bandpass filter are employed in tandem. One such example has been illustrated in conjunction with FIG. 7. The first dual-bandpass filter has two passbands, namely a passband 'A' of 400 nm to 675 nm and a passband 'B' of 840 nm to 860 nm approximately. The second dual-bandpass filter has two passbands, namely a passband 'C' of 400 nm to 650 nm and a passband 'D' of 840 nm to 860 nm approximately. It will be appreciated that the passbands 'A' and 'C' correspond to a visible-light region of an electromagnetic spectrum of light, whereas the passbands 'B' and 'D' correspond to a specific infrared-light region of the electromagnetic spectrum of light.

In the aforementioned implementation, the first dual-bandpass filter is implemented as an angle-dependent filter, whereas the second dual-bandpass filter is implemented as a fixed filter. Herein, the term "fixed filter" refers to a filter whose passband(s) do not shift with a change in an incident angle at which light is incident thereon. Therefore, in the first dual-bandpass filter, the passbands 'A' and 'B' shift based on a change in the incident angle of light. On the other hand, in the second dual-bandpass filter, there is no shift in the passbands 'C' and 'D' with a change in the incident angle of light.

It will be appreciated that in the aforementioned implementation, the second dual-bandpass filter allows transmission of light whose wavelength lies within the passband 'C' of 400 nm to 650 nm and the passband 'D' of 840 nm to 860 nm approximately.

In an example case where light is incident on the first dual-bandpass filter at an incident angle of zero degree ('0' degree), the first dual-bandpass filter allows transmission of light whose wavelength lies within the passband 'A' of 400 nm to 675 nm and the passband 'B' of 840 nm to 860 nm approximately. As the first dual-bandpass filter and the second dual-bandpass filter are employed in tandem, the first dual-bandpass filter and the second dual-bandpass filter allow transmission of light whose wavelength lies within a passband of 400 nm to 650 nm (namely, the visible-light region) and a passband of 840 nm to 860 nm (namely, the infrared-light region).

In another example case where light is incident on the first dual-bandpass filter at an incident angle of 30 degrees, there is a shift of approximately 25 nm in both the passbands 'A' and 'B' towards bluer wavelengths. Thus, when light is incident on the first dual-bandpass filter at an incident angle of 30 degrees, the first dual-bandpass filter allows transmission of light whose wavelength lies within the passband 'A' of 375 nm to 650 nm and the passband 'B' of 815 nm and 835 nm. Employed in tandem, the first dual-bandpass filter and the second dual-bandpass filter allow transmission of light whose wavelength lies within the passband of 400 nm to 650 nm (namely, the visible-light region) only, whilst blocking transmission of infrared light.

Furthermore, according to an embodiment, a first side of the semi-transparent reflective element faces the first image-sensor chip, while a second side of the semi-transparent reflective element faces the second image-sensor chip, wherein said means is implemented at least partially onto the second side of the semi-transparent reflective element. In such an implementation, said means is integrated at least partially into the semi-transparent reflective element. Such an implementation is applicable to both the fixed foveation case and the active foveation case.

A specific configuration of said means is incorporated, depending on an angle at which the second side of the semi-transparent reflective element is arranged with respect to the plane of the second image-sensor chip. As an example, when the semi-transparent reflective element is implemented as a prism, the second side of the semi-transparent reflective element is arranged at an angle of zero degree with respect to the plane of the second image-sensor chip (namely, parallel to said plane). Optionally, in such a case, when said means is implemented as the second infrared filter, the second infrared filter is formed on the second side of the semi-transparent reflective element, wherein the hole at the central portion is circular in shape. Alternatively, optionally, when said means is implemented as the first dual-bandpass filter and the second dual-bandpass filter, the first dual-bandpass filter is integrated onto the second side of the semi-transparent reflective element, wherein said means allows transmission of infrared light that is incident on the first dual-bandpass filter at an incident angle lying within a range that is selected from within a range of −30 degrees to +30 degrees. In such a case, said means blocks transmission of infrared light that is incident on the first dual-bandpass filter at an incident angle lying outside the aforesaid range selected from within the range of −30 degrees to +30 degrees. As an example, the aforesaid range could be selected as −30 degrees to +30 degrees, −25 degrees to +25 degrees, −20 degrees to +20 degrees, −15 degrees to +15 degrees, −10 degrees to +10 degrees, and the like.

As another example, when the semi-transparent reflective element is implemented as a semi-transparent mirror, the second side of the semi-transparent reflective element is arranged approximately at an angle of 45 degrees with respect to the plane of the second image-sensor chip. Optionally, in such a case, when said means is implemented as the second infrared filter, the hole at the central portion is elliptical in shape. Alternatively, optionally, when said means is implemented as the first dual-bandpass filter and the second dual-bandpass filter, said means allows transmission of infrared light that is incident on the first dual-bandpass filter at an incident angle lying within a range that is selected from within a range of +15 degrees to +75 degrees. In such a case, said means blocks transmission of infrared light that is incident on the first dual-bandpass filter at an incident angle lying outside the aforesaid range selected from within the range of +15 degrees to +75 degrees. As an example, the aforesaid range could be selected as +15 degrees to +75 degrees, +20 degrees to +70 degrees, +25 degrees to +65 degrees, +30 degrees to +60 degrees, +35 degrees to +55 degrees, and the like.

According to another embodiment, said means is implemented as a separate component, namely separate from the semi-transparent reflective element. Optionally, in such a case, when said means is implemented as the second infrared filter, the second infrared filter is arranged parallel to the plane of the second image-sensor chip. Alternatively, optionally, when said means is implemented as the first dual-bandpass filter and the second dual-bandpass filter, the first dual-bandpass filter and the second dual-bandpass filter are arranged parallel to the plane of the second image-sensor chip, wherein said means allows transmission of infrared light that is incident on the first dual-bandpass filter at an incident angle lying within a range that is selected from within a range of −30 degrees to +30 degrees. In such a case, said means blocks transmission of infrared light that is incident on the first dual-bandpass filter at an incident angle lying outside the aforesaid range selected from within the range of −30 degrees to +30 degrees. Yet alternatively, optionally, when said means is implemented as the first dual-bandpass filter and the second dual-bandpass filter, the first dual-bandpass filter is arranged approximately at an angle of 45 degrees with respect to the plane of the second image-sensor chip. In such a case, irrespective of an angle at which the second dual-bandpass filter is arranged with respect to the plane of the second image-sensor chip, said means allows transmission of infrared light that is incident on the first dual-bandpass filter at an incident angle lying within a range that is selected from within a range of +15 degrees to +75 degrees. Moreover, in such a case, said means blocks transmission of infrared light that is incident on the first dual-bandpass filter at an incident angle lying outside the aforesaid range selected from within the range of +15 degrees to +75 degrees.

It will be appreciated that there are two directions opposite to each other, namely a first direction pointing towards the real-world environment and a second direction point away from the real-world environment, the first direction and the second direction being perpendicular to a normal to a surface of the first dual-bandpass filter, when the first dual-bandpass filter is arranged approximately at the angle of 45 degrees with respect to the plane of the second image-sensor chip. The incident angle is measured as a positive value (for example, such as +15, +30 and +75 degrees and the like) along the first direction pointing towards the real-world environment, and is measured as a negative value (for example, such as −30 degrees and the like) along the second direction pointing away from the real-world environment.

It will also be appreciated that said means could be implemented as a separate component, irrespective of whether the imaging system implements fixed foveation or active foveation. In the fixed foveation case, when said means is implemented as the first dual-bandpass filter and the second dual-bandpass filter, said means is not required to be tilted or moved.

In the active foveation case, the first dual-bandpass filter could be either tilted independently or designed accordingly. Optionally, the first dual-bandpass filter is implemented as a separate component that is tiltable and designed to transmit infrared light that is incident on the first dual-bandpass filter at an incident angle lying within a range that is selected from within a range of −30 degrees to +30 degrees or from within a range of +15 degrees to +75 degrees.

Optionally, in this regard, the at least one imaging unit further comprises at least one first actuator associated with the first dual-bandpass filter, wherein the at least one processor is configured to:

obtain, from the display apparatus, information indicative of a gaze direction of a user; and control the at least one first actuator to tilt the first dual-bandpass filter based on the gaze direction of the user.

It will be appreciated that an angle by which the first dual-bandpass filter is tilted with respect to its default position could be beneficially limited to a certain range, so as to ensure that an angle of incidence of a chief ray of the overlapping FOV lies within the aforesaid selected range in which the first dual-bandpass filter allows infrared light to pass therethrough. As an example, the first dual-bandpass filter could be tilted within a range of −10 degrees to +10 degrees.

Moreover, it will be appreciated that in the active foveation case, the semi-transparent reflective element is also required to be tilted based on the user's gaze. Optionally, in this regard, the at least one imaging unit further comprises at least one second actuator associated with the semi-transparent reflective element, wherein the at least one processor is configured to:

obtain, from the display apparatus, the information indicative of the gaze direction of the user; and control the at least one second actuator to tilt the semi-transparent reflective element based on the gaze direction of the user.

As noted earlier, when the first dual-bandpass filter is implemented onto the second side of the semi-transparent reflective element, an angle by which the semi-transparent reflective element is tilted with respect to its default position could be beneficially limited to a certain range, so as to ensure that an angle of incidence of a chief ray of the overlapping FOV lies within the aforesaid selected range in which the first dual-bandpass filter allows infrared light to pass therethrough. As an example, the semi-transparent reflective element could be tilted within a range of −10 degrees to +10 degrees.

Throughout the present disclosure, the term "actuator" refers to an equipment that is employed to tilt (and optionally translate) a component with which it is associated. Such equipment may, for example, include electrical components, mechanical components, magnetic components, polymeric components and so forth. Such an actuator is driven by an actuation signal. It will be appreciated that the actuation signal could be a piezoelectric force, an electromagnetic force, a mechanical torque, an electric current, a hydraulic pressure, a pneumatic pressure or similar.

Beneficially, the imaging system could be implemented to mimic a foveated vision similar to a human vision. In the active foveation case, the tilt of the semi-transparent reflective element and, optionally, the tilt of the first dual-bandpass filter are controlled according to the detected gaze direction of the user, so as to follow the user's gaze as and when it changes. As a result, a high-resolution image is produced on the retina of the user's eye even when the user's gaze keeps shifting, while a low-resolution image is sufficient to be produced on a remaining portion of a fovea of the user's eye.

Throughout the present disclosure, the term "processor" refers to hardware, software, firmware or a combination of these, suitable for controlling an operation of the imaging system. The at least one processor is communicably coupled with an infrared light source and the at least one imaging unit wirelessly and/or in a wired manner. The at least one processor is implemented as at least one of: a processor of the display apparatus, a processor of a computing device that is communicably coupled with the display apparatus.

Furthermore, it will be appreciated that the aforementioned imaging system is at least communicably coupled to the display apparatus. In some implementations, the imaging system is external to the display apparatus. In such implementations, the infrared light source and the imaging unit could be mounted on a robot, a drone, a vehicle or similar. Moreover, in such implementations, the at least one processor could be merely communicably coupled to the infrared light source and the at least one imaging unit. In other implementations, the imaging system is integrated into the display apparatus.

Thus, the present disclosure also relates to the aforementioned display apparatus. Various embodiments and variants disclosed above, with respect to the aforementioned first aspect, apply mutatis mutandis to the display apparatus.

Optionally, said means comprises a second infrared filter having a hole at a central portion thereof, wherein the hole in the second infrared filter allows transmission of the infrared light towards the second image-sensor chip. Alternatively, optionally, said means comprises a first dual-bandpass filter and a second dual-bandpass filter, wherein the first dual-bandpass filter is angle dependent.

Moreover, optionally, the display apparatus further comprises means for detecting a gaze direction of a user. Optionally, the at least one imaging unit further comprises at least one first actuator associated with the first dual-bandpass filter, wherein the at least one processor is configured to control the at least one first actuator to tilt the first dual-bandpass filter based on the detected gaze direction of the user.

Additionally, optionally, the at least one imaging unit further comprises at least one second actuator associated with the semi-transparent reflective element, wherein the at least one processor is configured to control the at least one second actuator to tilt the semi-transparent reflective element based on the detected gaze direction of the user.

Moreover, optionally, a first side of the semi-transparent reflective element faces the first image-sensor chip, while a second side of the semi-transparent reflective element faces the second image-sensor chip, wherein said means is implemented at least partially onto the second side of the semi-transparent reflective element.

Throughout the present disclosure, the term "display apparatus" refers to a specialized equipment that is employed to present an extended-reality environment to the user when the display apparatus in operation is worn by the user on his/her head. The display apparatus acts as a device (for example, such as an extended-reality headset, a pair of extended-reality glasses and the like) that is operable to present a visual scene of an extended-reality environment to the user. It will be appreciated that the imaging system produces a sequence of extended-reality images for the display apparatus, wherein the sequence of extended-reality images, when rendered via the at least one image renderer of the display apparatus, creates the visual scene of the extended-reality environment. It will also be appreciated that the term "extended reality" encompasses virtual reality, augmented reality, mixed reality and the like.

Throughout the present disclosure the term "image renderer" refers to equipment that, in operation, renders the at least one extended-reality image that is to be presented to the user of the display apparatus. The at least one image renderer could be implemented as at least one display and/or at least one projector. When implemented as the at least one projector, the at least one extended-reality image could be projected onto a projection screen or directly onto the retina of the user's eye.

Throughout the present disclosure, the term "means for detecting the gaze direction" refers to specialized equipment for detecting and/or following a direction of gaze of the user of the display apparatus, when the display apparatus in operation is worn by the user. The means for detecting the gaze direction could be implemented as contact lenses with sensors, cameras monitoring a position of a pupil of the user's eye, and the like. Such means for detecting the gaze direction are well-known in the art. Beneficially, the means for detecting the gaze direction is arranged in a manner that said means does not cause any obstruction in an optical path of a projection of an image rendered via the at least one image renderer.

Furthermore, the present disclosure also relates to the aforementioned method. Various embodiments and variants disclosed above, with respect to the aforementioned first aspect, apply mutatis mutandis to the method.

Optionally, said means comprises a second infrared filter having a hole at a central portion thereof, wherein the hole in the second infrared filter allows transmission of the infrared light towards the second image-sensor chip. Alternatively, optionally, said means comprises a first dual-bandpass filter and a second dual-bandpass filter, wherein the first dual-bandpass filter is angle dependent.

Moreover, optionally, the at least one imaging unit further comprises at least one first actuator associated with the first dual-bandpass filter, wherein the method further comprises:

obtaining, from the display apparatus, information indicative of a gaze direction of a user; and controlling the at least one first actuator to tilt the first dual-bandpass filter based on the gaze direction of the user.

Furthermore, optionally, the at least one imaging unit further comprises at least one second actuator associated with the semi-transparent reflective element, wherein the method further comprises:

obtaining, from the display apparatus, information indicative of a gaze direction of a user; and controlling the at least one second actuator to tilt the semi-transparent reflective element based on the gaze direction of the user.

DETAILED DESCRIPTION OF THE DRAWINGS

Referring to FIG. 1, illustrated is a block diagram of architecture of an imaging system 100, in accordance with an embodiment of the present disclosure. The imaging system 100 comprises an infrared light source 102, at least one imaging unit (depicted as an imaging unit 104) and at least one processor (depicted as a processor 106) coupled to the infrared light source 102 and the imaging unit 104. The imaging unit 104 comprises a first image-sensor chip 108, a second image-sensor chip 110, a semi-transparent reflective element 112, a first infrared filter 114 and means 116 for transmitting infrared light received from an overlapping field of view towards the second image-sensor chip 110, whilst blocking transmission of infrared light received from a non-overlapping field of view towards the second image-sensor chip 110.

Figure 2:
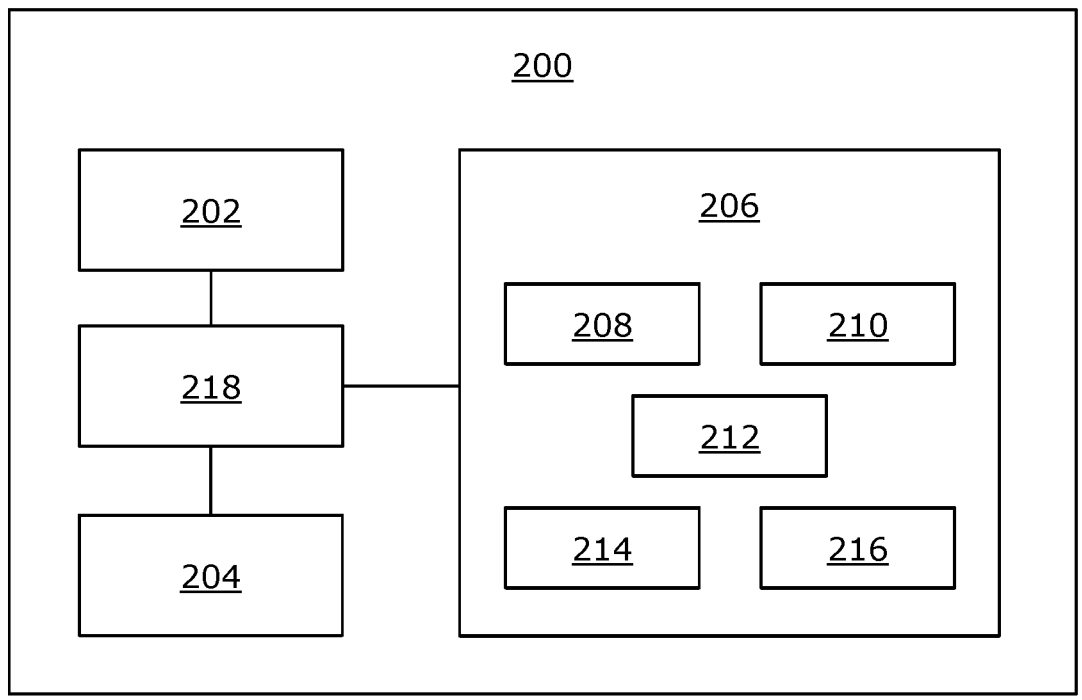
FIG. 2 is a block diagram of architecture of a display apparatus, in accordance with an embodiment of the present disclosure.

Referring to FIG. 2, illustrated is a block diagram of architecture of a display apparatus 200, in accordance with an embodiment of the present disclosure. The display apparatus 200 comprises at least one image renderer (depicted as an image renderer 202), an infrared light source 204 and at least one imaging unit (depicted as an imaging unit 206). The imaging unit 206 comprises a first image-sensor chip 208, a second image-sensor chip 210, a semi-transparent reflective element 212, a first infrared filter 214 and means 216 for transmitting infrared light received from an overlapping field of view towards the second image-sensor chip 210, whilst blocking transmission of infrared light received from a non-overlapping field of view towards the second image-sensor chip 210. The display apparatus 200 also comprises at least one processor (depicted as a processor 218) coupled to the image renderer 202, the infrared light source 204 and the imaging unit 206.

It will be appreciated that FIG. 1 and FIG. 2 depict simplified architectures of the imaging system 100 and the display apparatus 200, respectively, for the sake of clarity, which should not unduly limit the scope of the claims herein. A person skilled in the art will recognize many variations, alternatives and modifications of embodiments of the present disclosure.

Figure 3:
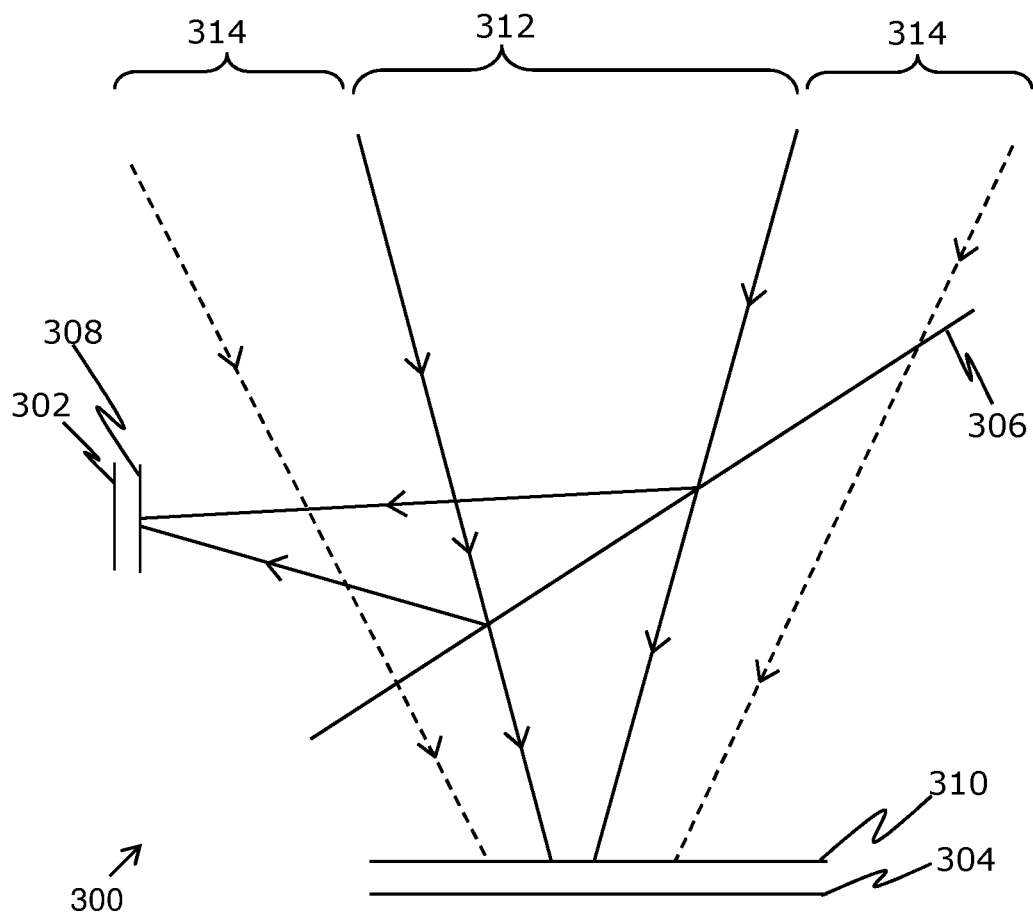
FIG. 3 is a ray diagram of light received from a real-world environment at an imaging unit of an imaging system, in accordance with an embodiment of the present disclosure.

Next, FIG. 3 depicts a ray diagram of light received from a real-world environment at an imaging unit 300, in accordance with an embodiment of the present disclosure. The imaging unit 300 comprises a first image-sensor chip 302, a second image-sensor chip 304, a semi-transparent reflective element 306, a first infrared filter 308 and means 310 for transmitting infrared light received from an overlapping field of view 312 towards the second image-sensor chip 304, whilst blocking transmission of infrared light received from a non-overlapping field of view 314 towards the second image-sensor chip 304.

It will be appreciated that FIG. 3 depicts a simplified two-dimensional view and is merely an example, which should not unduly limit the scope of the claims herein. A person skilled in the art will recognize many variations, alternatives and modifications of embodiments of the present disclosure. For example, said means 310 has been shown as a separate component in FIG. 3, namely separate from the semi-transparent reflective element 306. In alternative implementations, said means 310 could be integrated at least partially into the semi-transparent reflective element 306.

Figure 4:
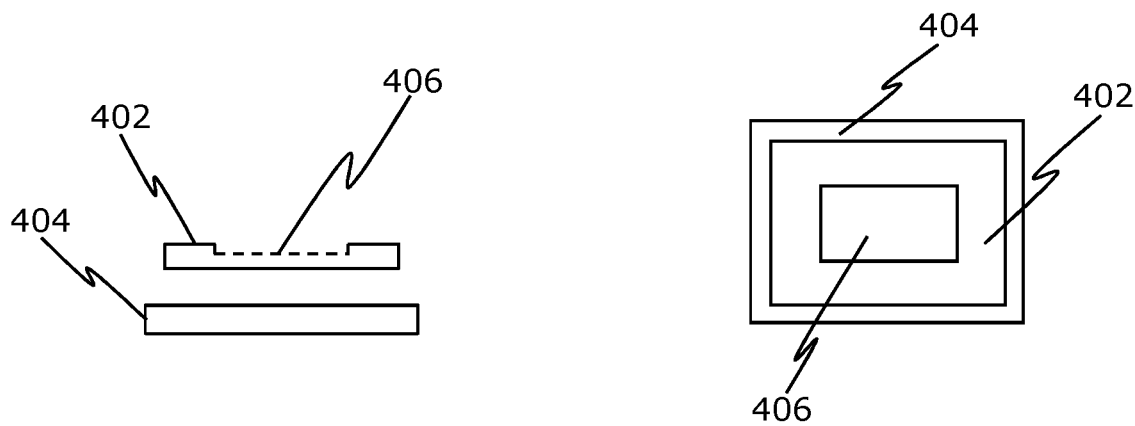
FIG. 4 depicts a side view and a top view of an infrared filter arranged in parallel with an image-sensor chip, in accordance with an embodiment of the present disclosure.

FIG. 4 depicts a side view and a top view of a second infrared filter 402 arranged in parallel with a second image-sensor chip 404, in accordance with an embodiment of the present disclosure. The second infrared filter 402 has a hole 406 at a central portion thereof.

FIG. 4 is merely an example, which should not unduly limit the scope of the claims herein. A person skilled in the art will recognize many variations, alternatives and modifications of embodiments of the present disclosure. For example, the shape of the hole 406 has been shown rectangular in FIG. 4; however, the hole 406 could alternatively have a circular shape, an elliptical shape or any other polygonal shape.

Figure 5A:
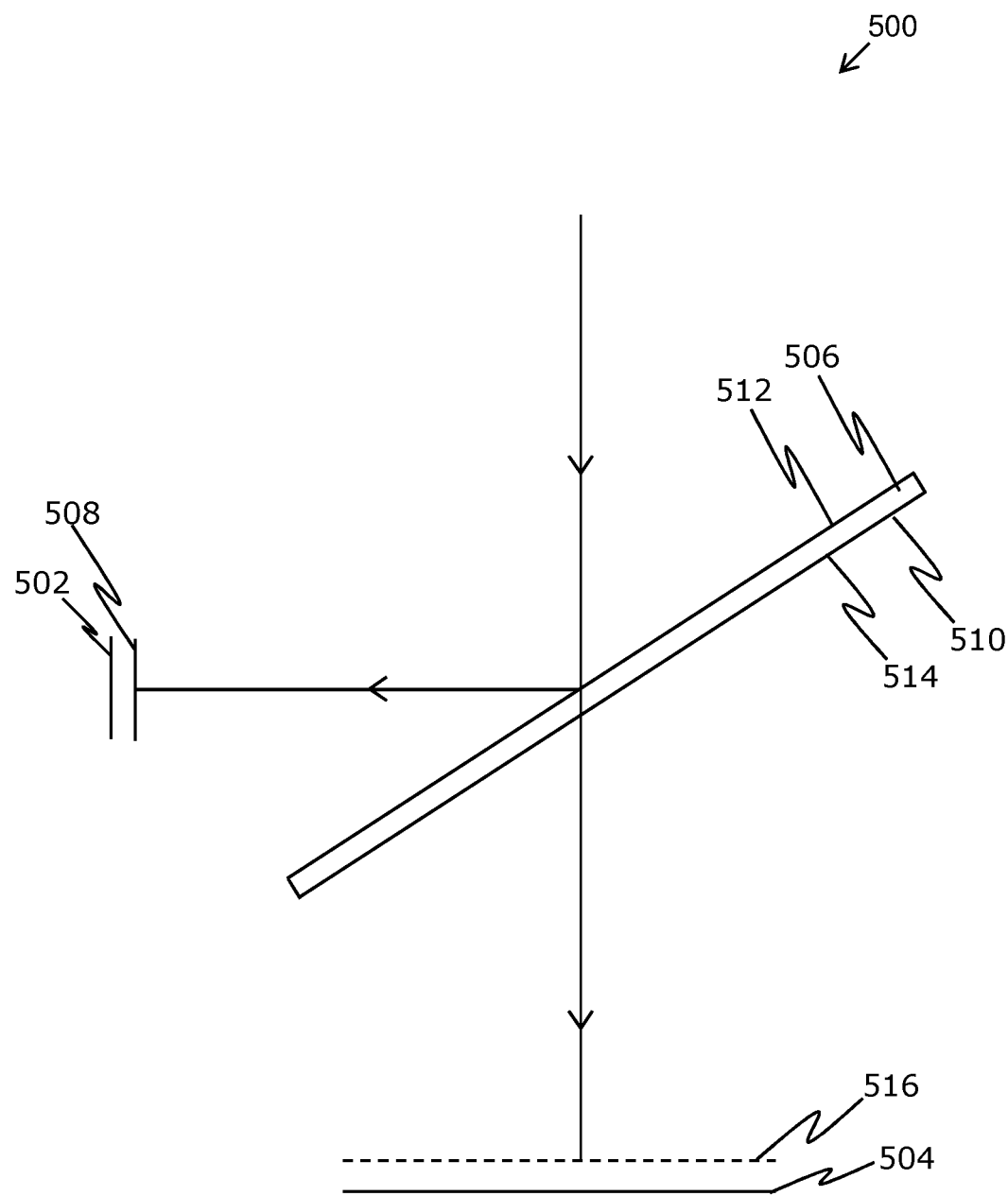
FIGS. 5A and 5B depict example implementations of an imaging unit, in accordance with an embodiment of the present disclosure.
Figure 5B:
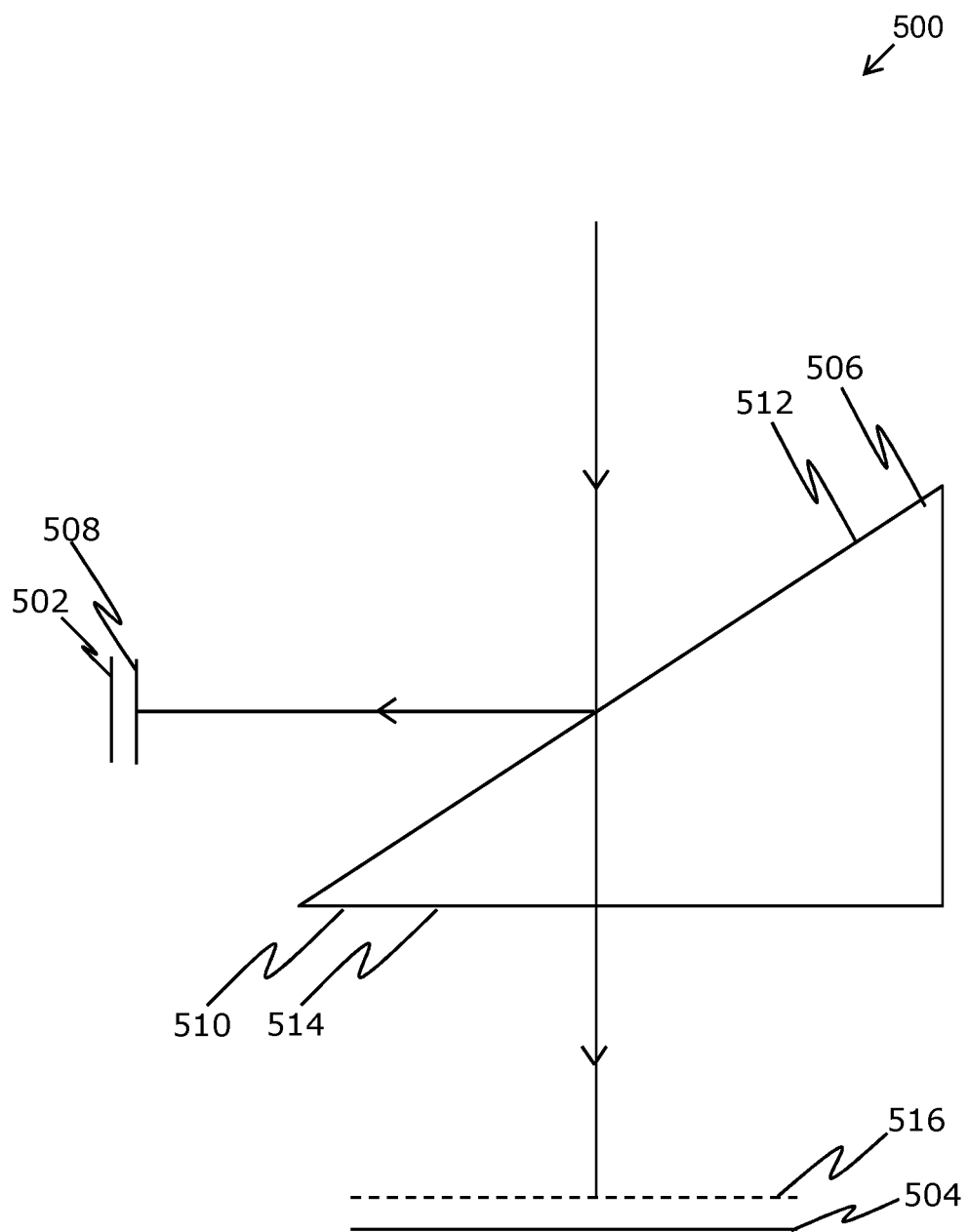

FIGS. 5A and 5B depict example implementations of an imaging unit 500, in accordance with an embodiment of the present disclosure. The imaging unit 500 comprises a first image-sensor chip 502, a second image-sensor chip 504, a semi-transparent reflective element 506, a first infrared filter 508 and means 510 for transmitting infrared light received from an overlapping field of view towards the second image-sensor chip 504, whilst blocking transmission of infrared light received from a non-overlapping field of view towards the second image-sensor chip 504.

In these example implementations, a first side 512 of the semi-transparent reflective element 506 faces the first image-sensor chip 502, while a second side 514 of the semi-transparent reflective element 506 faces the second image-sensor chip 504, wherein said means 510 is implemented at least partially onto the second side 514 of the semi-transparent reflective element 506.

In FIG. 5A, the semi-transparent reflective element 506 is shown as a semi-transparent mirror. Optionally, when said means 510 comprises a second infrared filter with a hole at a central portion, the hole is elliptical in shape. Alternatively, optionally, when said means 510 comprises a first dual-bandpass filter and a second dual-bandpass filter, the first dual-bandpass filter is implemented (depicted as 514) on the second side 514 of the semi-transparent reflective element 506, whereas the second dual-bandpass filter is implemented (depicted as 516) in parallel with the second image-sensor chip 504. In such a case, if the semi-transparent reflective element 506 is arranged approximately at an angle of 45 degrees with respect to a plane of the second image-sensor chip 504, said means 510 allows transmission of infrared light that is incident on the first dual-bandpass filter at an incident angle lying within a range that is selected from within a range of +15 degrees to +75 degrees.

In FIG. 5B, the semi-transparent reflective element 506 is shown as a prism, wherein the second side 514 is arranged parallel to the plane of the second image-sensor chip 504. Optionally, when said means 510 comprises the second infrared filter, the hole is circular in shape. Alternatively, optionally, when said means 510 comprises the first dual-bandpass filter and the second dual-bandpass filter, said means 510 allows transmission of infrared light that is incident on the first dual-bandpass filter at an incident angle lying within a range that is selected from within a range of −30 degrees to +30 degrees.

It will be appreciated that these example implementations are susceptible to be employed in fixed foveation as well as active foveation applications. In the fixed-foveation case, none of the components of the imaging unit 500 is required to be tilted or moved. In the active-foveation case, at least one of: the first image-sensor chip 502, the semi-transparent reflective element 506 is tilted based on the user's gaze.

Figure 6A:
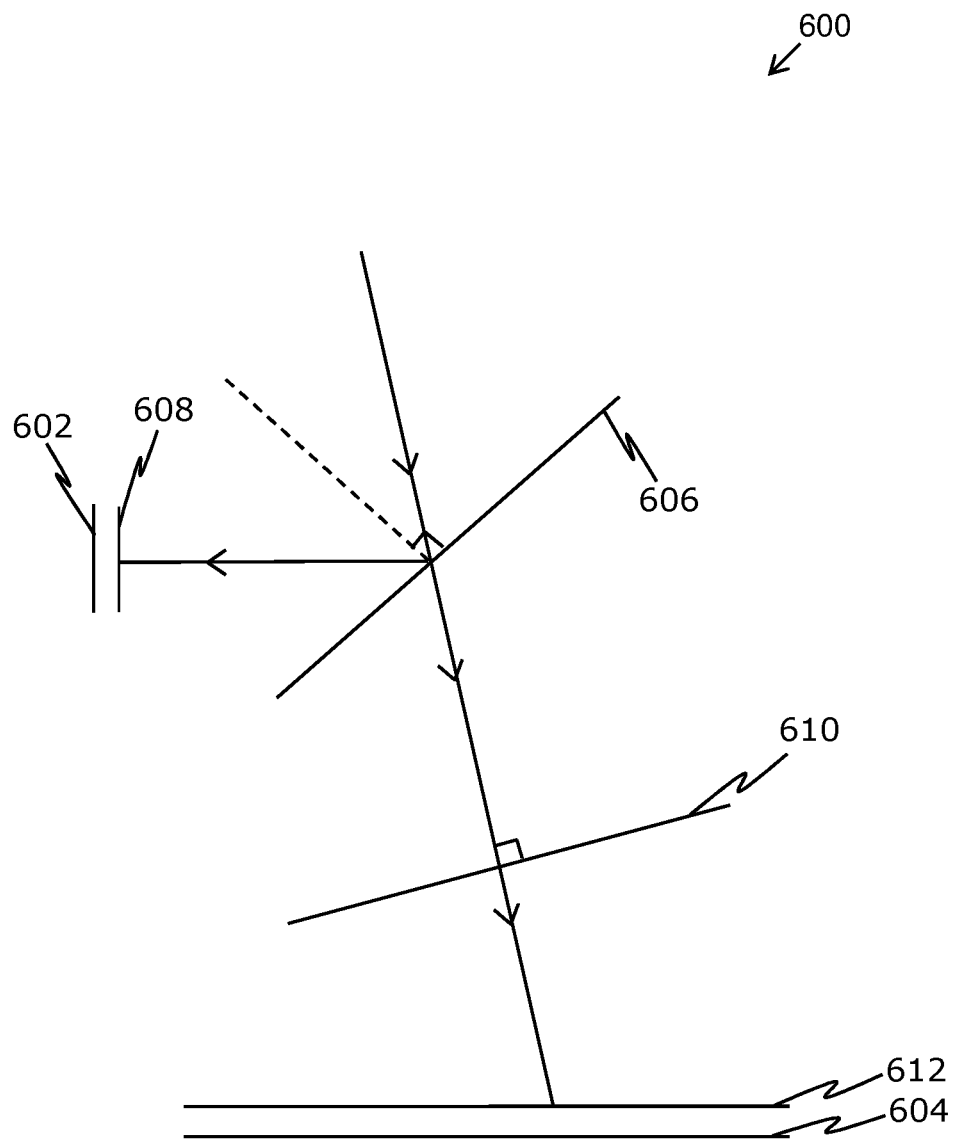
FIGS. 6A and 6B collective depict an example implementation of an imaging unit, in accordance with another embodiment of the present disclosure.
Figure 6B:
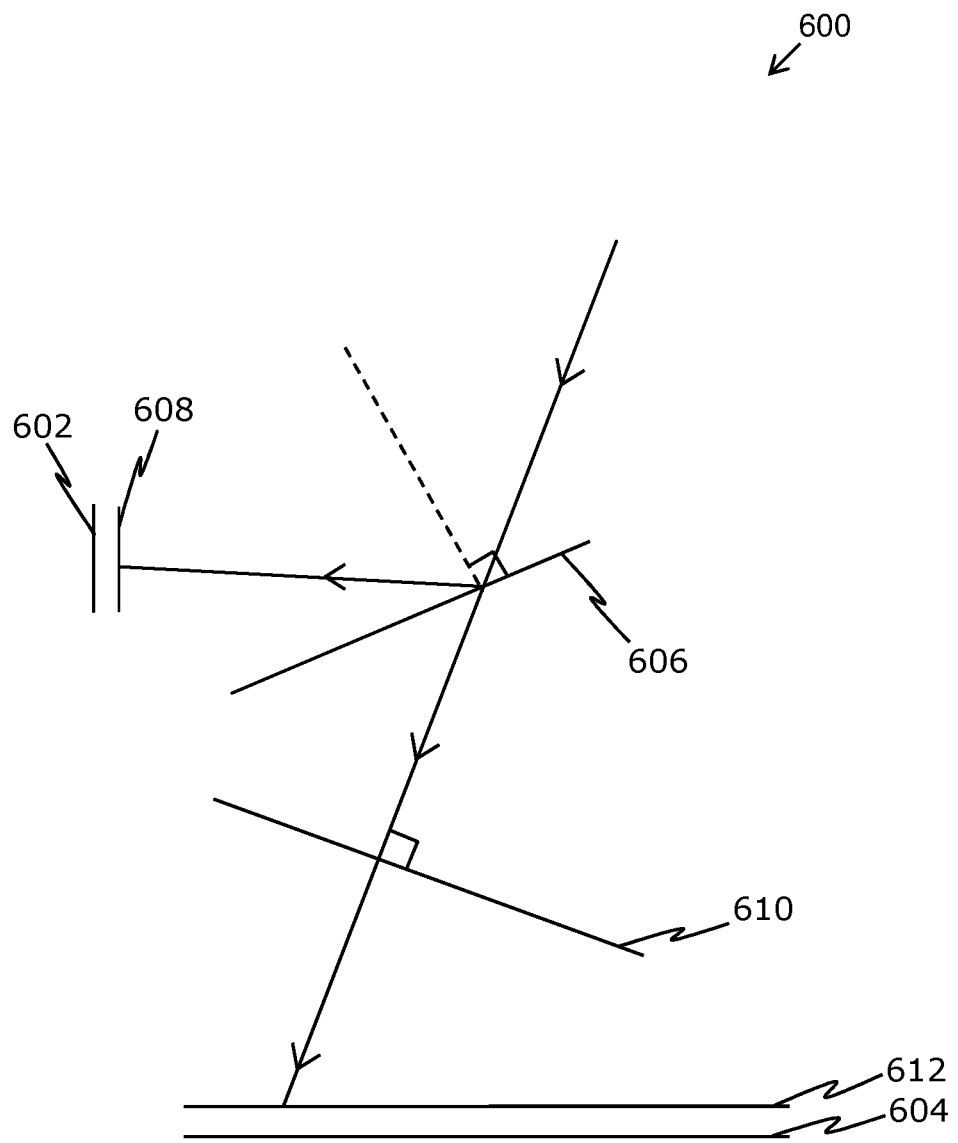

FIGS. 6A and 6B collectively depict an example implementation of an imaging unit 600, in accordance with another embodiment of the present disclosure. The imaging unit 600 comprises a first image-sensor chip 602, a second image-sensor chip 604, a semi-transparent reflective element 606, a first infrared filter 608 and means for transmitting infrared light received from an overlapping field of view towards the second image-sensor chip 604, whilst blocking transmission of infrared light received from a non-overlapping field of view towards the second image-sensor chip 604. Said means comprises comprises a first dual-bandpass filter 610 and a second dual-bandpass filter 612.

This example implementation is beneficially applicable to the active-foveation case, wherein at least one of: the first image-sensor chip 602, the semi-transparent reflective element 606 is tilted based on the user's gaze. Moreover, in the example implementation, the first dual-bandpass filter 610 is also titled based on the user's gaze. In this regard, the imaging unit 600 further comprises at least one first actuator (not shown) associated with the first dual-bandpass filter 610. Optionally, the imaging unit 600 also comprises at least one second actuator (not shown) associated with the semi-transparent reflective element 606. Additionally or alternatively, optionally, the imaging unit 600 comprises at least one third actuator (not shown) associated with the first image-sensor chip 602.

It will be appreciated that only a chief ray of an overlapping field of view has been shown in FIGS. 5A, 5B and 6A-B, for the sake of clarity. FIGS. 5A, 5B and 6A-B are merely examples, which should not unduly limit the scope of the claims herein. A person skilled in the art will recognize many variations, alternatives and modifications of embodiments of the present disclosure.

Figure 7:
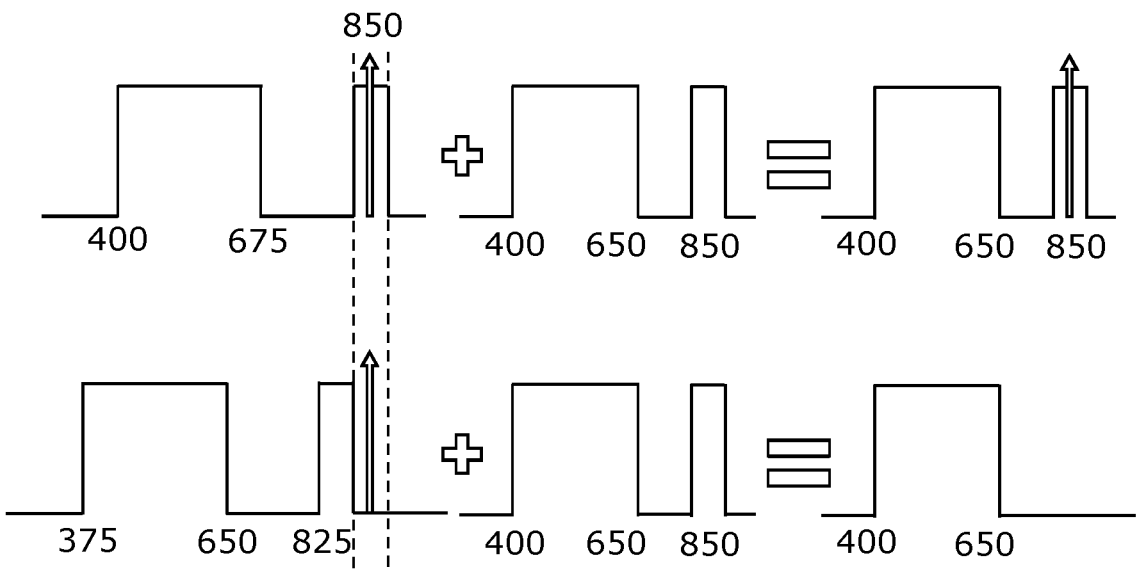
FIG. 7 is an example illustration of how a first dual-bandpass filter and a second dual-bandpass filter work, when arranged in tandem, in accordance with an embodiment of the present disclosure.

Next, FIG. 7 depicts how a first dual-bandpass filter and a second dual-bandpass filter work, when arranged in tandem, in accordance with an embodiment of the present disclosure. The first dual-bandpass filter has two passbands, namely a passband 'A' of 400 nm to 675 nm and a passband 'B' of 840 nm to 860 nm approximately. The second dual-bandpass filter has two passbands, namely a passband 'C' of 400 nm to 650 nm and a passband 'D' of 840 nm to 860 nm approximately.

The first dual-bandpass filter is implemented as an angle-dependent filter, whereas the second dual-bandpass filter is implemented as a fixed filter. Therefore, in the first dual-bandpass filter, the passbands 'A' and 'B' shift based on a change in an incident angle of light. On the other hand, in the second dual-bandpass filter, there is no shift in the passbands 'C' and 'D', irrespective of whether or not there is a change in the incident angle of light.

In an example case where light is incident on the first dual-bandpass filter at an incident angle of zero degree ('0' degree), the first dual-bandpass filter allows transmission of light whose wavelength lies within the passband 'A' of 400 nm to 675 nm and the passband 'B' of 840 nm to 860 nm approximately. As the first dual-bandpass filter and the second dual-bandpass filter are employed in tandem, the first dual-bandpass filter and the second dual-bandpass filter allow transmission of light whose wavelength lies within an overlapping passband of 400 nm to 650 nm (namely, a visible-light region) and another overlapping passband of 840 nm to 860 nm (namely, an infrared-light region).

In another example case where light is incident on the first dual-bandpass filter at an incident angle of 30 degrees, there is a shift of approximately 25 nm in both the passbands 'A' and 'B' towards the bluer wavelengths. Thus, when light is incident on the first dual-bandpass filter at an incident angle of 30 degrees, the first dual-bandpass filter allows transmission of light whose wavelength lies within the passband 'A' of 375 nm to 650 nm and the passband 'B' of 815 nm and 835 nm. As the first dual-bandpass filter and the second dual-bandpass filter are employed in tandem, the first dual-bandpass filter and the second dual-bandpass filter allow transmission of light whose wavelength lies within the overlapping passband of 400 nm to 650 nm (namely, the visible-light region) only, whilst blocking transmission of the infrared light.

FIG. 7 is merely an example, which should not unduly limit the scope of the claims herein. A person skilled in the art will recognize many variations, alternatives and modifications of embodiments of the present disclosure. For example, the passbands 'A', 'B', 'C' and 'D' could have different ranges than those in the aforementioned example cases.

Figure 8:
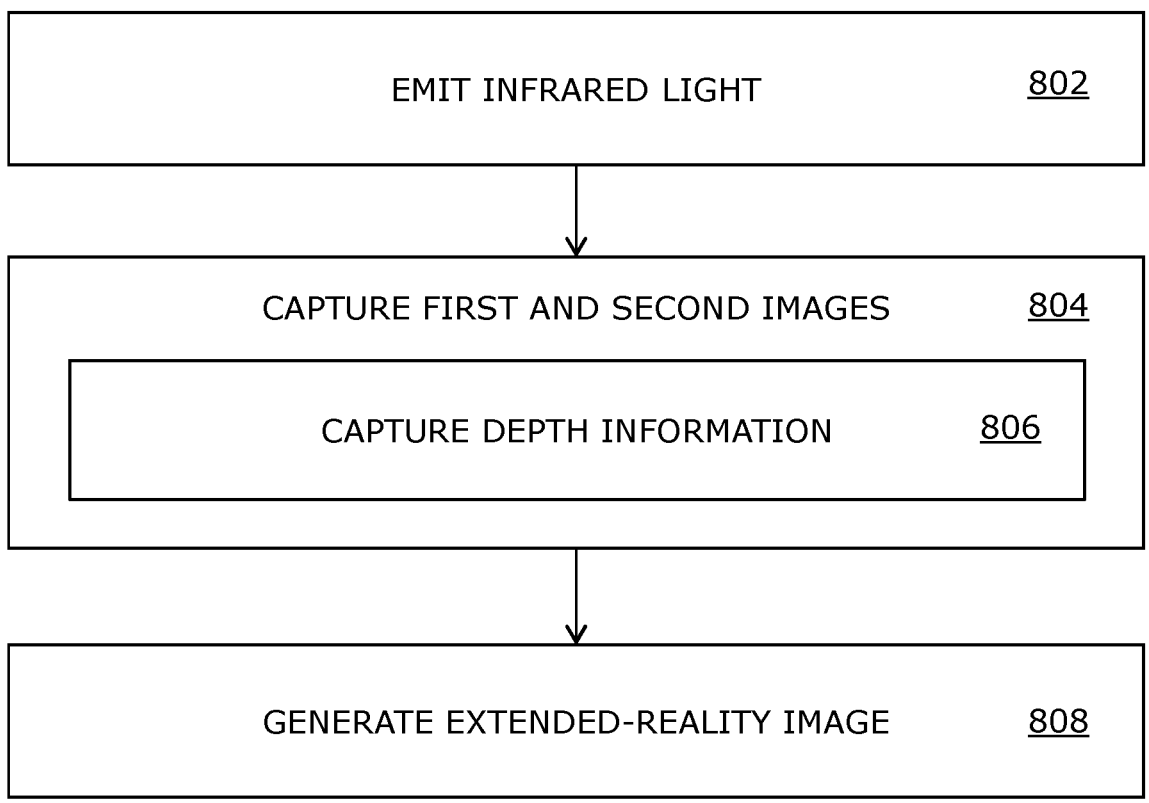
FIG. 8 is a flow chart depicting a method for producing images for a display apparatus, in accordance with an embodiment of the present disclosure.

Referring to FIG. 8, illustrated are steps of a method for producing images for a display apparatus, in accordance with an embodiment of the present disclosure. The method is implemented via an imaging system comprising an infrared light source and at least one imaging unit comprising: a first image-sensor chip having a first field of view; a second image-sensor chip having a second field of view, the second field of view being wider than the first field of view, wherein the second field of view comprises an overlapping field of view that overlaps with the first field of view and a remaining non-overlapping field of view; a semi-transparent reflective element arranged to reflect a portion of light received from a real-world environment towards the first image-sensor chip, whilst transmitting another portion of the light towards the second image-sensor chip; a first infrared filter arranged, on an optical path between the semi-transparent reflective element and the first image-sensor chip, to block transmission of infrared light towards the first image-sensor chip; and means for transmitting infrared light received from the overlapping field of view towards the second image-sensor chip, whilst blocking transmission of infrared light received from the non-overlapping field of view towards the second image-sensor chip, said means being arranged on an optical path between the semi-transparent reflective element and the second image-sensor chip.

At a step 802, infrared light is emitted via the infrared light source. At a step 804, a first image and a second image of the real-world environment are captured, via the first image-sensor chip and the second image-sensor chip, respectively. In accordance with the step 804, a resolution of the first image is higher than a resolution of the second image. The step 804 comprises a step 806 at which depth information is captured pertaining to the overlapping field of view via a portion of the second image-sensor chip that receives the infrared light from the overlapping field of view. At a step 808, at least one extended-reality image is generated from the first image and the second image based on said depth information, for presentation via the display apparatus.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

It will be appreciated that the terms "first" and "second" used herein do not denote any order, quantity or importance, but rather are used to distinguish one element from another.

What is claimed is:

1. An imaging system for producing images for a display apparatus, the imaging system comprising:
    an infrared light source that, in operation, emits infrared light;
    at least one imaging unit comprising:
        a first image-sensor chip having a first field of view;
        a second image-sensor chip having a second field of view, the second field of view being wider than the first field of view, wherein the second field of view comprises an overlapping field of view that overlaps with the first field of view and a remaining non-overlapping field of view;

a semi-transparent reflective element arranged to reflect a portion of light received from a real-world environment towards the first image-sensor chip, whilst transmitting another portion of the light towards the second image-sensor chip;

a first infrared filter arranged, on an optical path between the semi-transparent reflective element and the first image-sensor chip, to block transmission of infrared light towards the first image-sensor chip; and means for transmitting infrared light received from the overlapping field of view towards the second image-sensor chip, whilst blocking transmission of infrared light received from the non-overlapping field of view towards the second image-sensor chip, said means being arranged on an optical path between the semi-transparent reflective element and the second image-sensor chip; and at least one processor, communicably coupled to the infrared light source and the at least one imaging unit, configured to:

control the first image-sensor chip and the second image-sensor chip to capture a first image and a second image of the real-world environment, respectively, wherein a portion of the second image-sensor chip that receives the infrared light from the overlapping field of view, in operation, captures depth information pertaining to the overlapping field of view, and wherein a resolution of the first image is higher than a resolution of the second image; and generate from the first image and the second image at least one extended-reality image to be presented via the display apparatus, based on said depth information.

2. The imaging system of claim 1, wherein said means comprises a second infrared filter having a hole at a central portion thereof, wherein the hole in the second infrared filter allows transmission of the infrared light towards the second image-sensor chip.

3. The imaging system of claim 1, wherein said means comprises a first dual-bandpass filter and a second dual-bandpass filter, wherein the first dual-bandpass filter is angle dependent.

4. The imaging system of claim 3, wherein the first dual-bandpass filter is a dichroic filter.

5. The imaging system of claim 3, wherein the first dual-bandpass filter and the second dual-bandpass filter allow transmission of infrared light that is incident on the first dual-bandpass filter at an incident angle lying within a range that is selected from within a range of −30 degrees to +30 degrees.

6. The imaging system of claim 3, wherein the first dual-bandpass filter and the second dual-bandpass filter allow transmission of infrared light that is incident on the first dual-bandpass filter at an incident angle lying within a range that is selected from within a range of +15 degrees to +75 degrees.

7. The imaging system of claim 3, wherein the at least one imaging unit further comprises at least one first actuator associated with the first dual-bandpass filter, wherein the at least one processor is configured to:

obtain, from the display apparatus, information indicative of a gaze direction of a user; and control the at least one first actuator to tilt the first dual-bandpass filter based on the gaze direction of the user.

8. The imaging system of claim 1, wherein the at least one imaging unit further comprises at least one second actuator associated with the semi-transparent reflective element, wherein the at least one processor is configured to:

obtain, from the display apparatus, information indicative of a gaze direction of a user; and control the at least one second actuator to tilt the semi-transparent reflective element based on the gaze direction of the user.

9. The imaging system of claim 1, wherein a first side of the semi-transparent reflective element faces the first image-sensor chip, while a second side of the semi-transparent reflective element faces the second image-sensor chip, wherein said means is at least partially implemented onto the second side of the semi-transparent reflective element.

10. A display apparatus comprising:
at least one image renderer;
an infrared light source that, in operation, emits infrared light;
at least one imaging unit comprising:
 a first image-sensor chip having a first field of view;
 a second image-sensor chip having a second field of view, the second field of view being wider than the first field of view, wherein the second field of view comprises an overlapping field of view that overlaps with the first field of view and a remaining non-overlapping field of view;
 a semi-transparent reflective element arranged to reflect a portion of light received from a real-world environment towards the first image-sensor chip, whilst transmitting another portion of the light towards the second image-sensor chip;
 a first infrared filter arranged, on an optical path between the semi-transparent reflective element and the first image-sensor chip, to block transmission of infrared light towards the first image-sensor chip; and
 means for transmitting infrared light received from the overlapping field of view towards the second image-sensor chip, whilst blocking transmission of infrared light received from the non-overlapping field of view towards the second image-sensor chip, said means being arranged on an optical path between the semi-transparent reflective element and the second image-sensor chip; and
at least one processor configured to:
 control the first image-sensor chip and the second image-sensor chip to capture a first image and a second image of the real-world environment, respectively, wherein a portion of the second image-sensor chip that receives the infrared light from the overlapping field of view, in operation, captures depth information pertaining to the overlapping field of view, and wherein a resolution of the first image is higher than a resolution of the second image;
 generate from the first image and the second image at least one extended-reality image, based on said depth information; and
 render the at least one extended-reality image via the at least one image renderer.

11. The display apparatus of claim 10, wherein said means comprises a second infrared filter having a hole at a central portion thereof, wherein the hole in the second infrared filter allows transmission of the infrared light towards the second image-sensor chip.

12. The display apparatus of claim 10, wherein said means comprises a first dual-bandpass filter and a second dual-bandpass filter, wherein the first dual-bandpass filter is angle dependent.

13. The display apparatus of claim 12, further comprising means for detecting a gaze direction of a user, wherein the at least one imaging unit further comprises at least one first actuator associated with the first dual-bandpass filter wherein the at least one processor is configured to control the at least one first actuator to tilt the first dual-bandpass filter based on the detected gaze direction of the user.

14. The display apparatus of claim 10, further comprising means for detecting a gaze direction of a user, wherein the at least one imaging unit further comprises at least one second actuator associated with the semi-transparent reflective element, wherein the at least one processor is configured to control the at least one second actuator to tilt the semi-transparent reflective element based on the detected gaze direction of the user.

15. The display apparatus of claim 10, wherein a first side of the semi-transparent reflective element faces the first image-sensor chip, while a second side of the semi-transparent reflective element faces the second image-sensor chip, wherein said means is implemented at least partially onto the second side of the semi-transparent reflective element.

16. A method for producing images for a display apparatus, the method being implemented via an imaging system comprising an infrared light source and at least one imaging unit comprising:
   a first image-sensor chip having a first field of view;
   a second image-sensor chip having a second field of view, the second field of view being wider than the first field of view, wherein the second field of view comprises an overlapping field of view that overlaps with the first field of view and a remaining non-overlapping field of view;
   a semi-transparent reflective element arranged to reflect a portion of light received from a real-world environment towards the first image-sensor chip, whilst transmitting another portion of the light towards the second image-sensor chip;
   a first infrared filter arranged, on an optical path between the semi-transparent reflective element and the first image-sensor chip, to block transmission of infrared light towards the first image-sensor chip; and
   means for transmitting infrared light received from the overlapping field of view towards the second image-sensor chip, whilst blocking transmission of infrared light received from the non-overlapping field of view towards the second image-sensor chip, said means being arranged on an optical path between the semi-transparent reflective element and the second image-sensor chip, the method comprising:
   emitting infrared light via the infrared light source;
   capturing, via the first image-sensor chip and the second image-sensor chip, a first image and a second image of the real-world environment, respectively, wherein the step of capturing comprises capturing depth information pertaining to the overlapping field of view via a portion of the second image-sensor chip that receives the infrared light from the overlapping field of view, and wherein a resolution of the first image is higher than a resolution of the second image; and
   generating from the first image and the second image at least one extended-reality image to be presented via the display apparatus, based on said depth information.

17. The method of claim 16, wherein said means comprises a second infrared filter having a hole at a central portion thereof, wherein the hole in the second infrared filter allows transmission of the infrared light towards the second image-sensor chip.

18. The method of claim 16, wherein said means comprises a first dual-bandpass filter and a second dual-bandpass filter wherein the first dual-bandpass filter is angle dependent.

19. The method of claim 18, wherein the at least one imaging unit further comprises at least one first actuator associated with the first dual-bandpass filter, wherein the method further comprises:
   obtaining, from the display apparatus, information indicative of a gaze direction of a user; and
   controlling the at least one first actuator to tilt the first dual-bandpass filter based on the gaze direction of the user.

20. The method of claim 16, wherein the at least one imaging unit further comprises at least one second actuator associated with the semi-transparent reflective element, wherein the method further comprises:
   obtaining, from the display apparatus, information indicative of a gaze direction of a user; and
   controlling the at least one second actuator to tilt the semi-transparent reflective element based on the gaze direction of the user.

* * * * *